(No Model.)
T. B. ATTERBURY.
MANUFACTURE OF GLASS BOTTLES AND VESSELS FOR CONTAINING FIRE EXTINGUISHING COMPOUNDS.
No. 299,318. Patented May 27, 1884.
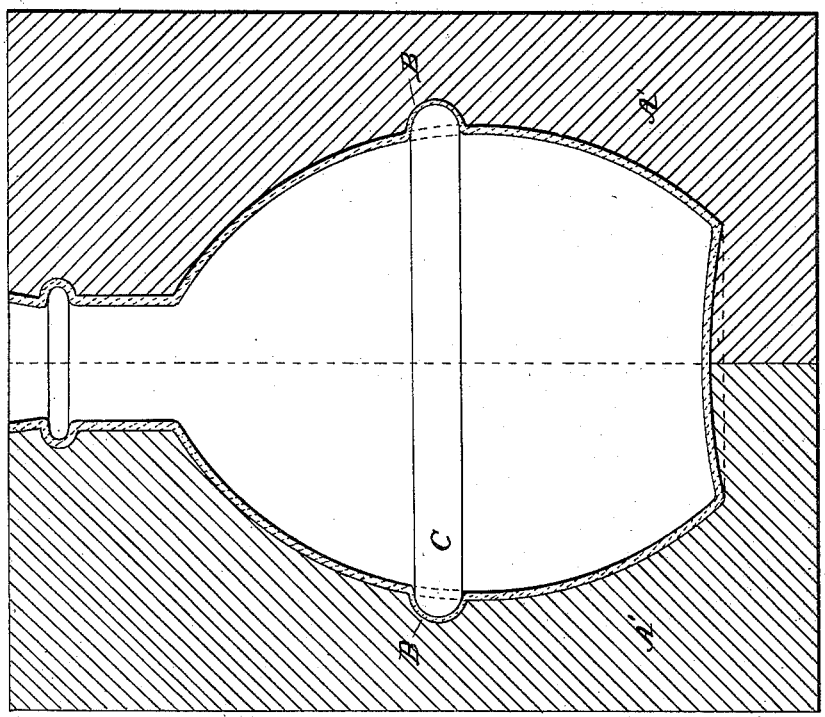
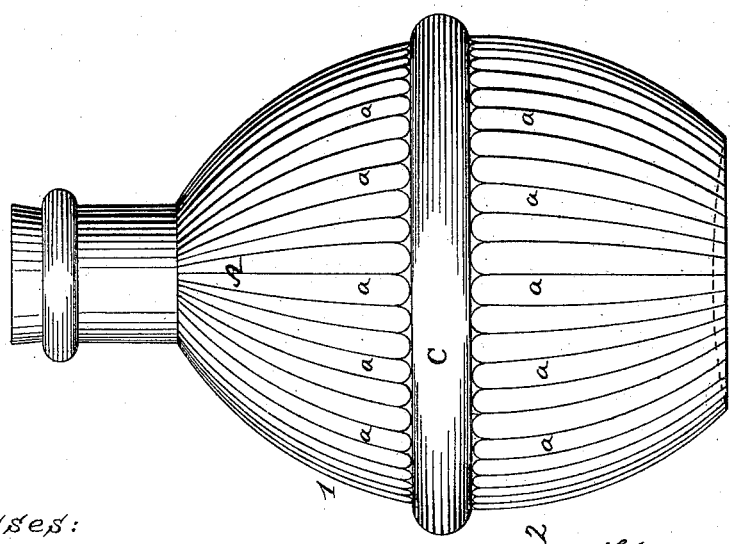
Witnesses:
T. C. Brecht
G. d. Raffer
Inventor:
Thos. B. Atterbury
Per D. W. Ginsabaugh
Attorney.

UNITED STATES PATENT OFFICE.

THOMAS B. ATTERBURY, OF PITTSBURG, PENNSYLVANIA.

MANUFACTURE OF GLASS BOTTLES AND VESSELS FOR CONTAINING FIRE-EXTINGUISHING COMPOUNDS.

SPECIFICATION forming part of Letters Patent No. 299,318, dated May 27, 1884.

Application filed April 16, 1884. (No model.)

*To all whom it may concern:*

Be it known that I, THOMAS B. ATTERBURY, a citizen of the United States, residing at Pittsburg, in the county of Allegheny and State of Pennsylvania, have invented certain new and useful Improvements in the Manufacture of Glass Bottles and Vessels for Containing Fire-Extinguishing Compounds, of which the following is a specification, reference being had therein to the accompanying drawings.

My invention relates to improvements in the manufacture of glass bottles.

The object of my invention is to produce a bottle or other vessel for holding the acid and alkali to be used in extinguishing fires, which will be strong enough to resist the outward pressure of the gases produced by the union of the acid and alkali, and yet be readily broken when requied for use.

My invention consists in blowing a glass bottle or other vessel with a raised rib or band, or a series of raised ribs or bands, which project beyond the main body or surface of the vessel, said rib or band being made thinner at its apex than the other portions of the vessel, so that the vessel will be readily broken along the line of the ribs or bands.

Referring to the drawings, Figure 1 is a sectional view of a glass mold with the article therein. Fig. 2 is a side elevation of the completed article.

A indicates the glass bottle or other vessel, having upper and lower corrugated or ribbed sections, 1 2, joined by a raised rib or band of the same material and integral therewith, said rib being made thinner than the other portions of the article, as will more fully appear.

A' A' are the sections of the mold, hinged together in the ordinary manner, and may be recessed at their lower ends, so as to embrace a dovetailed base, on which the bottom of the article is formed. The interior of the mold is provided with a series of vertical and parallel depressions or elevations, (not shown,) so as to form a corrugated surface, a, on the body of the article.

Corrugating the surface of the article, as above indicated, imparts great strength to the same, and the contraction of the glass when cooling draws the corrugated surfaces toward the center, and gives a greater resistance to the walls of the article from inside pressure.

B is a recess formed in the interior walls of the mold, in which the raised rib or band C is formed. As before intimated, the apex of the raised band or rib is thinner than the other portions of the article, so that the article can be readily broken at this point, and in order to produce this thin rib or band I proceed in the following manner: The blower places the bulb of glass in the mold, and blows in the usual manner until the article assumes the form of the mold, and the walls of the article will lie across the recess B, as indicated by dotted lines in Fig. 1. The blower then increases the pressure of air in the article by mechanical or other means until the walls of the article, which lie across the recess B, are blown and expanded into said recess to form the rib C, and, as a consequence, the rib will be much thinner at the apex or outside than the body of the article, so that the bottle will be weak as to outside pressure or concussion. The prominence of the rib will bring it in contact with any article against which the bottle may be thrown sooner than any other portion of the bottle, while at the same time the raised rib or band acts as a hoop to resist the inside pressure.

Instead of forming the raised rib or band around the bottle, I may form them in the direction of the length of the bottle; or I may form several raised ribs around the bottle; or, instead of ribs and bands, projecting points may be formed at intervals over the entire surface of the bottle, said points being blown thinner than the other portions of the bottle, and adapted to be readily broken off when thrown against a hard object. A bottle thus constructed, when filled with a proper fire-extinguishing chemical, is thrown onto the fire, so as to cause it to break and scatter the contents over the fire and put it out.

A great difficulty has heretofore been experienced by the bottles falling onto the fire without breaking, and thus the desired result defeated; but by making the bottle as herein described and shown I produce an article which will readily yield to concussion, and will break if thrown onto the carpeted floor of an apartment.

Having thus described my invention, what I claim, and desire to secure by Letters Patent, is—

1. As a new article of manufacture, a glass bottle or vessel for containing a fire-extinguishing chemical, consisting of frangible sections 1 2, connected by the homogeneous and more fragile sections or ribs C, as set forth.

2. As a new article of manufacture, a glass bottle or vessel for containing a fire-extinguishing compound or chemical, consisting of upper or lower sections having ribs or corrugations $a$, connected by the thinner and more fragile rib C, as set forth.

In testimony whereof I affix my signature in presence of two witnesses.

THOMAS B. ATTERBURY.

Witnesses:
D. P. BERG,
H. J. WENKE.